United States Patent
Hosseini et al.

(10) Patent No.: US 9,716,323 B2
(45) Date of Patent: Jul. 25, 2017

(54) RFID ANTENNA SYSTEM WITH MULTI-AXIS POLARIZATION FOR FIELD INSTALLATION AND BEAM STEERING OPERATIONS

(71) Applicants: Alister Hosseini, Long Beach, CA (US); Steve E. Trivelpiece, Rancho Santa Margarita, CA (US)

(72) Inventors: Alister Hosseini, Long Beach, CA (US); Steve E. Trivelpiece, Rancho Santa Margarita, CA (US)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 232 days.

(21) Appl. No.: 14/645,984

(22) Filed: Mar. 12, 2015

(65) Prior Publication Data
US 2016/0268696 A1    Sep. 15, 2016

(51) Int. Cl.
| | | |
|---|---|---|
| H01Q 21/24 | (2006.01) | |
| G06K 7/00 | (2006.01) | |
| G06K 7/10 | (2006.01) | |
| H01Q 1/22 | (2006.01) | |
| H01Q 1/52 | (2006.01) | |

(52) U.S. Cl.
CPC .......... *H01Q 21/24* (2013.01); *G06K 7/0008* (2013.01); *G06K 7/10356* (2013.01); *H01Q 1/2216* (2013.01); *H01Q 1/523* (2013.01)

(58) Field of Classification Search
CPC ...... H01Q 21/24; H01Q 21/00; H01Q 1/2216; G06K 7/10356
USPC ................... 340/572.7; 343/702, 895, 725
See application file for complete search history.

(56) References Cited

U.S. PATENT DOCUMENTS

| | | | |
|---|---|---|---|
| 7,079,079 B2* | 7/2006 | Jo ........................... | H01Q 1/243 343/700 MS |
| 8,531,298 B2* | 9/2013 | Tuttle ............... | G06K 19/07749 340/572.1 |
| 2006/0187135 A1* | 8/2006 | Maniwa ................ | H01Q 1/007 343/795 |

(Continued)

FOREIGN PATENT DOCUMENTS

WO          00/14694 A1      3/2000

OTHER PUBLICATIONS

EPO International Search Report and Written Opinion for Intl. Appln. No. PCT/US2016/021493 dated Jun. 8, 2016.

*Primary Examiner* — Dameon E Levi
*Assistant Examiner* — Hasan Islam
(74) *Attorney, Agent, or Firm* — Fox Rothschild LLP; Robert J. Sacco; Carol E. Thorstad-Forsyth

(57) ABSTRACT

Antenna system includes a fixture having a first portion and a second portion joined along an alignment axis. A first planar antenna element having a first polarization direction is aligned with a first plane, and secured to the first portion of the antenna fixture. A second planar antenna element has a second polarization direction aligned with a second plane. The second planar antenna element is secured to the second portion of the antenna fixture so that the second plane is transverse to the first plane and the first and second planes intersect along a line parallel to the alignment axis. At least one tuned element mitigates near-field interference as between the first planar antenna element and the second planar antenna element. Signals applied to the antenna feed port will result in three-polarization radiation.

16 Claims, 6 Drawing Sheets

(56) References Cited

U.S. PATENT DOCUMENTS

| | | | |
|---|---|---|---|
| 2006/0237544 A1* | 10/2006 | Matsuura | G06K 19/0726 235/492 |
| 2007/0222602 A1 | 9/2007 | Luo | |
| 2009/0284377 A1 | 11/2009 | Tuttle | |
| 2011/0032159 A1* | 2/2011 | Wu | H01Q 21/08 343/702 |
| 2013/0099898 A1 | 4/2013 | Bloy | |

* cited by examiner

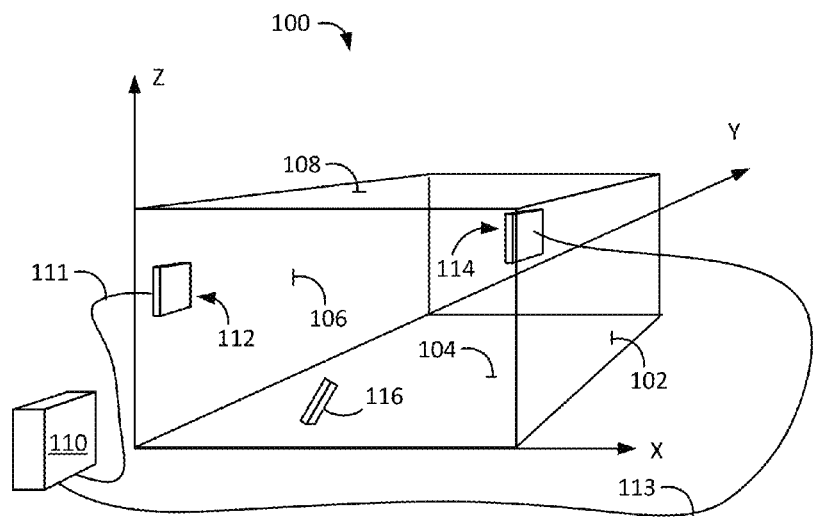
FIG. 1
(Prior Art)
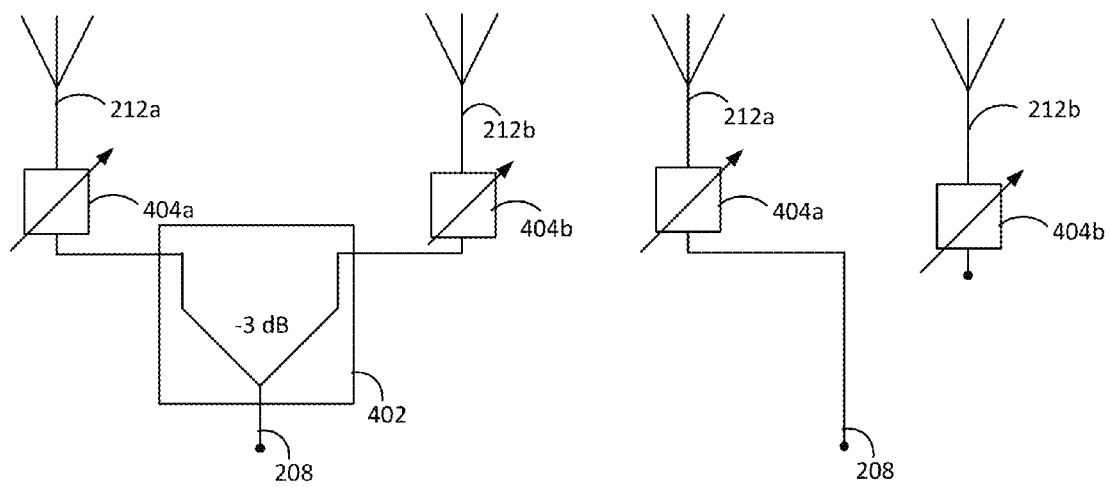
FIG. 4A  FIG. 4B

US 9,716,323 B2

RFID ANTENNA SYSTEM WITH MULTI-AXIS POLARIZATION FOR FIELD INSTALLATION AND BEAM STEERING OPERATIONS

BACKGROUND OF THE INVENTION

Statement of the Technical Field

The present invention relates generally to Radio Frequency Identification (RFID) systems. More particularly, the present invention relates to antennas for RFID systems which facilitate transmission and reception of radio frequency signals having various polarizations.

Description of the Related Art

RFID systems use wireless technology to automatically extract identification information from tags that are typically attached to objects or people. The information is electronically stored in the tag and is usually transmitted by the tag in response to an external electromagnetic stimulus. The tags are available in a variety of formats but are most commonly powered using electromagnetic induction methods. In such systems, the energy for powering the tag and for wirelessly transmitting the stored information is derived from an external applied electro-magnetic field which is produced by a reader antenna i.e., an antenna which is connected to a RFID reader system). Accordingly, each RFID tag will include an antenna to harvest energy from the externally applied electromagnetic field and to broadcast the information stored on the tag.

One of the main challenges in a practical RFID system is the ability to generate an applied external electromagnetic field that has good coverage throughout a desired area (e.g., a room or a hallway). One suggested solution to this problem is a steerable phased array antenna system which can be used advantageously to track the position and trajectory of an RFID tag within a detection zone. For example, such a steerable phased array antenna RFID tag locater and tracking system is disclosed in US Patent Publication No. 20130099898 A1.

SUMMARY OF THE INVENTION

The present invention concerns a field installation optimized radio frequency identification (RFID) antenna system. The antenna system includes an antenna fixture having a first portion and a second portion joined along an alignment axis. A first planar antenna element having a first polarization direction is aligned with a first plane, and secured to the first portion of the antenna fixture. A second planar antenna element has a second polarization direction aligned with a second plane. The second planar antenna element is secured to the second portion of the antenna fixture so that the second plane is transverse to the first plane and the first and second planes intersect along a line parallel to the alignment axis. The two planes can be orthogonal or may form an oblique angle. An antenna feed port is secured to the fixture is directly coupled to at least one of the first and second planar antenna elements. The RFID antenna system further includes at least one tuned element which mitigates near-field interference as between the first planar antenna element and the second planar antenna element when the first and second planar antenna elements are mounted in the antenna fixture. The first and second polarization directions defined by the first and second antenna elements together comprise three transverse field components which include the entire polarization space, meaning that they include polarization components aligned along the x, y, and z-axes). Accordingly, signals applied to the antenna feed port will result in three-polarization radiation.

According to a further aspect, to form an array structure, two identical sets of antenna elements as described herein can be placed next to each other. Such an antenna system can include third and fourth planar antenna elements disposed in alignment with the first and second planes. The third and fourth planar antenna elements can be placed adjacent to the first and second antennas, secured to the first and second portions of the antenna fixture respectively. A fourth planar antenna element is disposed in alignment with the second plane and has a fourth polarization direction parallel to the second polarization direction. The fourth planar antenna element is secured to the second portion of the antenna fixture. The antenna feed port according to such further aspect is directly coupled to at least one of the third and fourth planar antenna elements. At least one dynamic phase control element is provided and responsive to a control signal to dynamically shift a phase of a signal applied to the first and second planar antenna element relative to the phase of signals applied to the third and fourth planar antenna elements. The dynamic phase control element is thus used for steering a direction of an antenna pattern having three-polarization radiation. The arrangements described herein facilitate fast and efficient set-up in the field of three-polarization antenna systems by unskilled technicians, in a variety of installation scenarios.

BRIEF DESCRIPTION OF THE DRAWINGS

Embodiments will be described with reference to the following drawing figures, in which like numerals represent like items throughout the figures, and in which:

FIG. 1 is a schematic representation of an RFID system for detecting RFID tags in a detection zone.

FIG. 4A is a schematic diagram that is useful for understanding a first exemplary feed circuit which can be used in the three-polarization antenna system shown in FIG. 1.

FIG. 4B is a schematic diagram that is useful for understanding a second exemplary feed circuit which can be used in the three-polarization antenna system shown in FIG. 1.

DETAILED DESCRIPTION OF THE INVENTION

Figure 2:
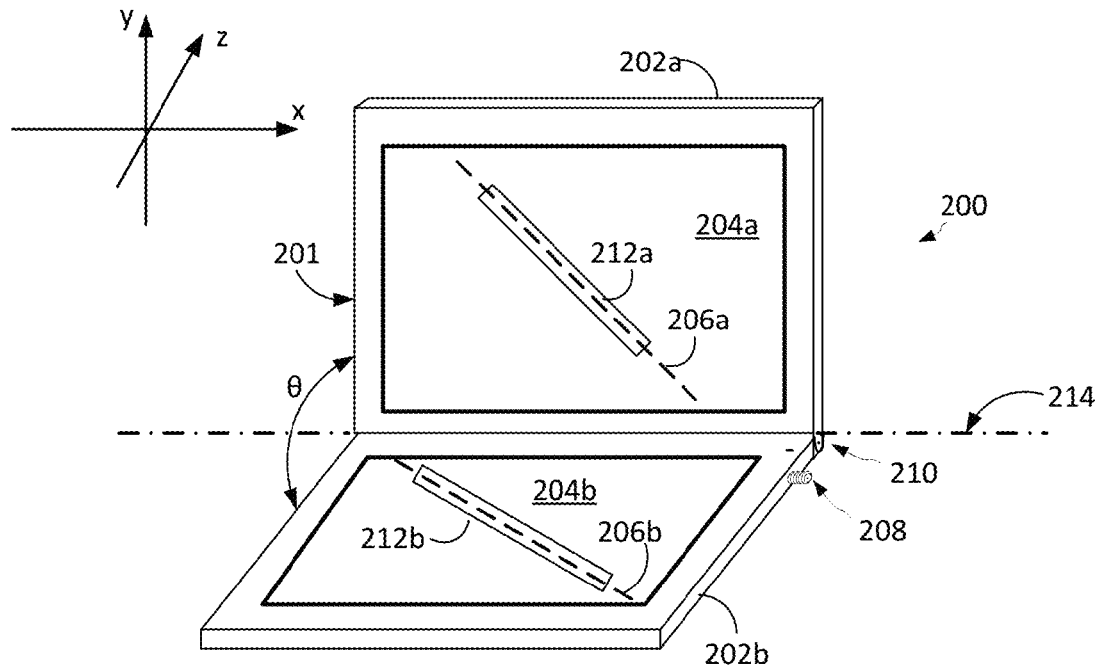
FIG. 2 is a perspective view of a three-polarization antenna system that is useful for understanding the inventive arrangements.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

The performance of conventional RFID systems (i.e. formed by RFID antenna(s) and a reader) strongly depends on the orientation of RFID tags in the field. Since the tags can have a random orientation, the ability of such tags to harvest RF energy from an applied electromagnetic field having a single polarization (e.g. vertical or horizontal polarization) can be adversely affected. For example, this can occur when the polarization of the applied electromagnetic field by a reader antenna is not aligned with a polarization orientation of the tag antenna. A similar problem occurs when the RFID tag generates an RF transmission containing the information stored on the tag. The orientation of the antenna in the RFID tag will produce radiation with a polarization defined along a particular axis. However, because the orientation of the tag is unpredictable, the polarization of the transmitted radiation may not be aligned with the polarization of the reader antenna (or may weakly couple to such available polarization(s). Substantial signal losses can occur when a polarization of a receiving antenna is not aligned with a polarization of transmitted signals. Accordingly, it can be difficult for an RFID reader to detect the presence of RFID tags when tags have sub-optimal orientations.

Accordingly, the inventive arrangements concern an antenna unit formed in two angled surfaces (e.g. two perpendicular surfaces) which is intended to provide effective reception and transmission of RF signals which are polarized along any axis defined in three-dimensional space. Accordingly, an antenna as disclosed herein is designed for receiving and transmitting signals which have component polarization vectors aligned with three (3) different orthogonal axes. The ability to receive and transmit RF radiation with polarization vectors aligned in three orthogonal directions is advantageous as it improves visibility of RFID tags in field.

As shown in FIG. 1, a conventional RFID system 100 can include an RFID reader 110 which is connected to one or more reader antennas 112, 114 for detecting an RFID tag 116 in a detection zone. An RFID reader 110 will generally include a transmitter (not shown) for transmitting RFID interrogation signals, a receiver (not shown) for detecting RFID response produced by RFID tags 116 in a detection zone, and a processing component (not shown) for processing transmitted and received RFID signals. In this example the detection zone is defined by a room or hallway having a floor 104, a ceiling 108 and side walls 102, 106. An RFID system such as RFID system 100 is well known in the art and therefore will not be described here in detail.

Planar antennas are often used for implementing RFID reader antennas 112, 114 due to their simplicity, low cost, and aesthetic appearance (which is unobtrusive because of the planar form factor). However, a planar antenna can receive RF signals with minimal attenuation only when an antenna in an RFID tag is aligned with the planar surface of the antenna. When the tag is perpendicular to the planar antenna surface, signals will be substantially attenuated due to the orthogonal polarization orientation. In such a scenario, the RFID tag 116 may be substantially invisible to the RFID reader 110.

A plurality of independent planar RFID reader antennas 112, 114 in various locations/positions within a detection zone can be coupled to the RFID reader 100 in order to improve the visibility the RFID tags in the system. However, this approach is costly and inherently produces signal losses due to the necessity of extra cabling and circuitry that is required. Even for an experienced installer, it is difficult to implement an optimized antenna solution in the field. Locating two antennas in close proximity will produce near field interference which is destructive to the antenna patterns of each antenna. Multiple antennas will generally produce complex field patterns which are very difficult to control and tune for a desired performance of the system. Also, different installation locations may have different installation conditions and constraints such that design parameters will vary from site to site. In fact, complex computer analysis and modeling is often the only way to truly determine the interaction of the various antennas and the resulting fields that are produced in a particular installation. It will be appreciated that these approaches to solving the problem are necessarily costly and time consuming.

Figure 3:
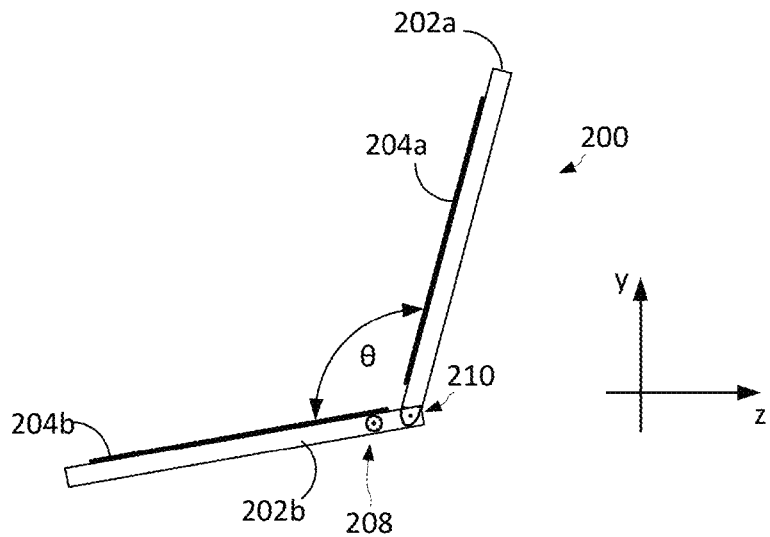
FIG. 3 is a side view of the three-polarization antenna system in FIG. 2.

Referring now to FIGS. 2 and 3 there is illustrated an exemplary embodiment of a field installation optimized radio frequency identification (RFID) antenna system 200 which is advantageously used as an RFID reader antenna. The RFID antenna system 200 includes an antenna fixture 201 having a first portion 202a and a second portion 202b joined along an alignment axis 214. A first planar antenna element 212a having a first polarization direction along axis 206a is aligned with a first plane which can be defined by a first planar substrate 204a. Although a the first planar antenna element defines a single polarization direction which is aligned with the first plane, it should be understood that such first polarization direction can have vector components aligned with two orthogonal axes that together define the first plane. For example, this will occur when axis 206a is oblique to the x and y axis as shown. Accordingly, if the first planar antenna is aligned with the xy-plane as shown in FIG. 2, it can have a single polarization direction, but that polarization direction can advantageously have vector components aligned with both the x and y axis. Consequently, such an antenna element can include polarization component vectors along two orthogonal axes (e.g., the x and y axes in FIG. 2).

The first planar substrate 204a is formed of a suitable dielectric material layer, a metal foil layer which forms a ground plane, or a combination of these two layers. Dielectric substrates as described herein are well known in the art and are commercially available. The first planar antenna element can be any of various well known types of planar antenna elements such as a dipole or a patch antenna. The design and feeding of planar antenna elements such as those referenced herein is well known and therefore will not be described here in detail. The first planar substrate 204a including the first planar antenna element is secured to the first portion 202a of the antenna fixture as shown.

A second planar antenna element 212b is disposed on a second planar substrate 204b. The second planar substrate is similar to the first planar substrate 204a. Accordingly, the second planar substrate can be comprised of a dielectric sheet on which a metal layer is disposed. The second planar antenna element has a second polarization direction 206b that is aligned with a second plane. For example, the second plane can be defined by the second planar substrate 204b. Like the first polarization direction, the second polarization direction can be have vector components aligned with two orthogonal axes that together define the second plane in which the second planar antenna element is disposed. For example, if the second planar antenna element is generally aligned with the xz-plane as shown in FIG. 2, it has a single polarization direction (aligned with axis 206b). But if the second polarization direction is oblique with respect to the x and z axis, then that polarization direction has vector components aligned with both the x and z axis. Consequently, such an antenna element will include polarization component vectors along the x and z direction.

The second planar substrate 204b, including the second planar antenna element 212b is secured to the second portion of the antenna fixture. The second plane defined by planar substrate 204b is transverse to the first plane defined by planar substrate 204a such that the first and second planes intersect along the alignment axis 214 or a line which is parallel to the alignment axis. In FIG. 2, the alignment axis 214 is shown aligned with the x axis. According to one aspect of the invention, the first and second polarization directions as defined by the first and second planar antenna elements 212a, 212b is each arranged so that it is oblique with respect to the alignment axis 214. With the arrangement as described herein the first and second planar antenna elements will in combination always produce electromagnetic radiation including component polarization vectors aligned with each of three orthogonal axes (e.g., x, y and z). For convenience, such electromagnetic radiation shall sometimes be referred to herein as three-polarization radio frequency (RF) radiation. Similarly, such antenna elements will always be responsive to an electromagnetic field produced by an RFID tag, regardless of the polarization orientation of the tag's antenna.

In the antenna system 200, the antenna fixture 201 is essentially a supporting element and the planar antenna elements 212a, 212b are generally exposed. However, the invention is not limited in this regard and the antenna fixture 201 can optionally comprise a housing which fully or partially encloses the first and second planar antenna elements. The fixture can be formed of metal or plastic. However, if the fixture comprises a housing which encloses the antenna elements, the material which covers the antenna elements should be chosen so as not to interfere with the antenna pattern. Accordingly, a suitable dielectric material can be preferred for the housing in such scenarios. Note, that a similar structure can be formed by slot antennas (i.e. slits or holes in metallic planes); in this case, the radiating part and the enclosure can be (i.e. metal).

An antenna system 200 as described herein will advantageously have a single excitation point which is preferably provided directly on the antenna fixture or housing. For example, an antenna feed port 208 can be provided for this purpose. The antenna feed port 208 is secured to the antenna fixture 201 and is electrically coupled to at least one of the first and second planar antenna elements 212a, 212b. Two feeding methodologies can be considered for such an antenna system. In a direct feed arrangement as shown in FIG. 4A, the feed port 208 is connected to RF power-divider circuit 402 and signals applied to the feed port 208 will be divided between the first and second antenna elements 212a, 212b. Signals received by the two antenna elements 212a, 212b will be summed at the antenna port and communicated by means of suitable RF cabling to an RFID reader (e.g. RFID reader 110). Alternatively, in an indirect feeding method shown in FIG. 4B, only one of the antenna elements 212a will be excited directly from the feed port. However, since these two antenna elements 212a, 212b are in close proximity (e.g., less than 1 wavelength) of each other, each will necessarily reside in the near-field of the other antenna and will thus be tightly coupled. Accordingly, an antenna element 212b will also be excited, even though not directly connected by cabling or other components to the feed port 208. The two antenna elements will similarly interact when signals are received at the antenna system.

The two planar antenna elements 212a, 212b will interact with each other in their near-field/active zone. If the two planar antenna elements were arbitrarily fed with RF energy and positioned close to one another by a field installer so as to permit such near-field interaction, one would expect that the resulting RF field pattern would contain nulls and other distortions which would result in sub-optimal performance. However, because the form factor of the antenna system 200 is established in advance by the fixture 201, the interaction of the antenna elements 212a, 212b and the feed network for the antenna can be analyzed and tuned at design time. By using suitable commercially available antenna analysis software and applying known antenna design principles, three-polarization RF radiation can be achieved from the antenna system 200 with a desired antenna pattern. The design of the antenna will naturally involve consideration of the position and orientation of the antenna elements 212a, 212b as defined by the fixture 201 which will affect interaction of the antenna elements with each other in the near field.

Using the design methods described herein, three-polarization radiation with an optimized antenna radiation pattern can be achieved when the two antenna elements are maintained in their fixed transverse orientation (in which the first plane and second plane may be orthogonal with respect to one another or form a different angle). The resulting antenna system 200 will include at least one tuned element 404a, 404b. The at least one tuned element will be designed and implemented to mitigate near-field interference as between the first planar antenna element 212a and the second planar antenna element 212b when the first and second planar antenna elements are mounted in the antenna fixture. As such, the at least one tuned element can be selected and/or optimized using commercially available electromagnetic modeling and simulation software.

According to one aspect, the tuned element 404a, 404b can be a reactive component or a network of reactive components. In such a scenario, the reactive component or network can be provided in one or both of the feed paths for planar antenna elements 212a, 212b. Alternatively, the reactive component or network can be electrically connected to a portion of one or both of the planar antenna elements 212a, 212b. According to another aspect, the tuned element may be integral to the first and/or second planar antenna elements 212a, 212b. For example, the tuned element may involve certain modifications to the dimensions, geometry and/or feed point of a planar antenna element 212a, 212b. In some scenarios, two or more tuned elements as described herein can be used for each of the planar antenna elements.

With an RFID antenna system 200 having the arrangement described herein, the first and second polarization directions 206a, 206b are each transverse to the alignment axis 214 and in different planes (first and second planes defined by first and second planar substrates 204a, 204b). Accordingly, signals applied to the antenna feed port 208 will result in three-polarization radiation. Likewise, received signals having a polarization direction defined by vectors in any of three orthogonal axes can be efficiently processed by the antenna system 200. As used herein, the term three-polarization radiation shall be understood to mean a field of RF energy in which a polarization direction of the RF energy is defined by vectors which are aligned with each of three orthogonal axes (e.g. axes x, y and z in FIG. 2).

Figure 5A:
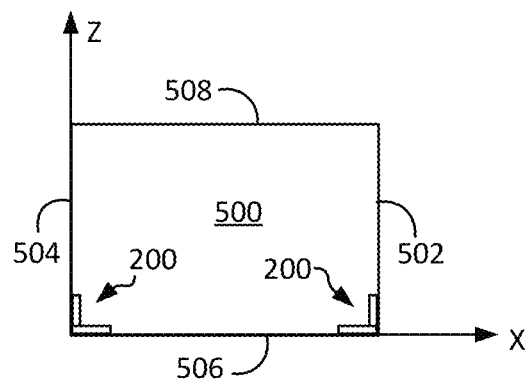
FIGS. 5A-5C are a series of drawings showing how the three-polarization antenna system of FIG. 1 can be installed to facilitate RFID tag detection in a detection zone.
Figure 5B:
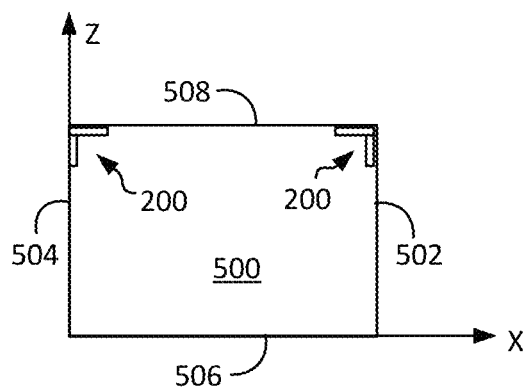
Figure 5C:
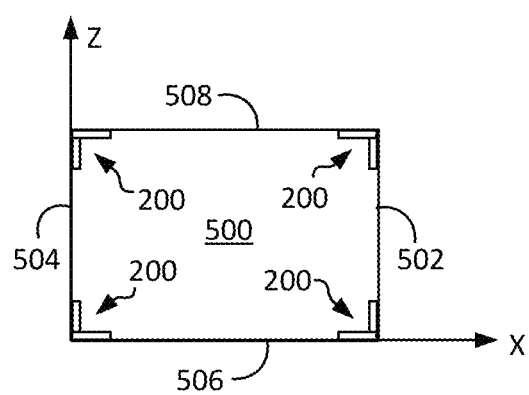

The antenna system 200 as described herein is well suited for installation in a room or hallway which defines an RFID tag detection zone. Referring now to FIGS. 5A-5C, a room or hallway comprising an RFID detection zone 500 is enclosed by a floor 504, a ceiling 508, and walls 502, 504. In such a scenario, one or more antenna assemblies 200 can be mounted as shown in FIG. 5A with the first planar antenna element 212a of each antenna system respectively aligned with and adjacent to walls 502, 504. The second planar antenna element 212b for each antenna system 200 can be disposed aligned with and adjacent to floor 506. Accordingly, an installation technician can quickly implement an antenna system with three-polarization reader antennas and optimized beam pattern to enhance detection of RFID tags in the detection zone. FIG. 5B shows a similar arrangement where the first planar antenna element 212a of each antenna system 200 is respectively aligned with and adjacent to a wall 502, 504. The second planar antenna element 212b is disposed aligned with and adjacent to a ceiling 508. As a third alternative, the arrangements in FIGS. 5A and 5B can be combined as shown in FIG. 5C. In each case illustrated in FIGS. 5A-5C, antenna systems 200 would be connected to an RFID reader (not shown) such as RFID reader 110.

The antenna fixture 201 in the RFID antenna system 200 described herein will at least partially maintain a relative position and orientation of the first and second planar antenna elements 212a, 212b with respect to each other. For example, the antenna fixture 201 can establish a fixed angle θ (e.g. 90 degrees) which is maintained between the first plane and the second plane defined by first and second planar substrates 204a, 204b. Accordingly, a relative position of the first and second planar antenna elements 212a, 212b can sometimes be fixed and known at design time. However, different installation scenarios may sometimes require that θ be an angle other than 90 degrees to accommodate architectural features and other requirements. For such scenarios, the antenna fixture 201 can also facilitate adjustment such that the angle θ between the first and second plane can be varied to suit a particular installation. According to one aspect, the antenna fixture 201 can comprise a hinge 210 that facilitates rotation of the first portion 202a of antenna fixture 201 relative to the second portion 202b. Accordingly, the antenna fixture 201 can be rotatably adjustable about the alignment axis (or a line parallel to the alignment axis) to selectively vary an angle between the first and second plane in accordance with an installation requirement.

In a scenario where hinge 210 is provided, the near field interaction of the first and second planar antenna elements 212a, 212b will vary in accordance with changes to angle θ. This variation in near filed interaction can adversely affect the resulting antenna pattern if not accounted for as part of the design. Accordingly, a tuning element 404a, 404b can advantageously have a plurality of defined antenna tune settings which are selectable by an installation technician in a field setting to predictably conform the RFID antenna system to the installation requirement. The selectable antenna tune settings are adjustable so that the installation technician can choose a particular setting to suit an installation scenario. For example, if the tuning element is an adjustable capacitor or inductor element, the tune setting can be adjusted using a knob or screw. Alternatively, one or more switches can be used to selectively connect or remove certain reactive components to the circuit. The tuning element can also include one or more resistive components, although resistive component are not preferred as they usually introduce loss. A plurality of optimal settings for each of the tuning elements 404a, 404b is advantageously predetermined at design time in accordance with a plurality of different angular positions defined by the angle between the first and second plane. Each of these optimal settings corresponding to various angles of θ can be determined and recorded using electromagnetic modeling and simulation software. The installation technician can then simply determine the angle θ required for a particular installation setting and choose the setting for the tuning element(s) which corresponds to such angle.

An RFID system 100 can utilize an electronically steered antenna beam to facilitate detection and identification of RFID tags in a detection zone. For example, a phased array antenna arrangement can be used to electronically steer an antenna beam or pattern. Briefly, a phased array antenna uses an array of antenna elements and phase shift components to selectively introduce a phase shift to signals applied to certain antenna elements in the array. These phase shifting operations control a pointing direction of the antenna beam. According to a further aspect of the invention, the basic antenna system concept described with respect to FIGS. 2-4 can be expanded to facilitate a field-installation optimized phased array implementation for an RFID reader with three-polarization RF radiation capability. An exemplary embodiment of such an arrangement is illustrated in FIG. 6.

Figure 6:
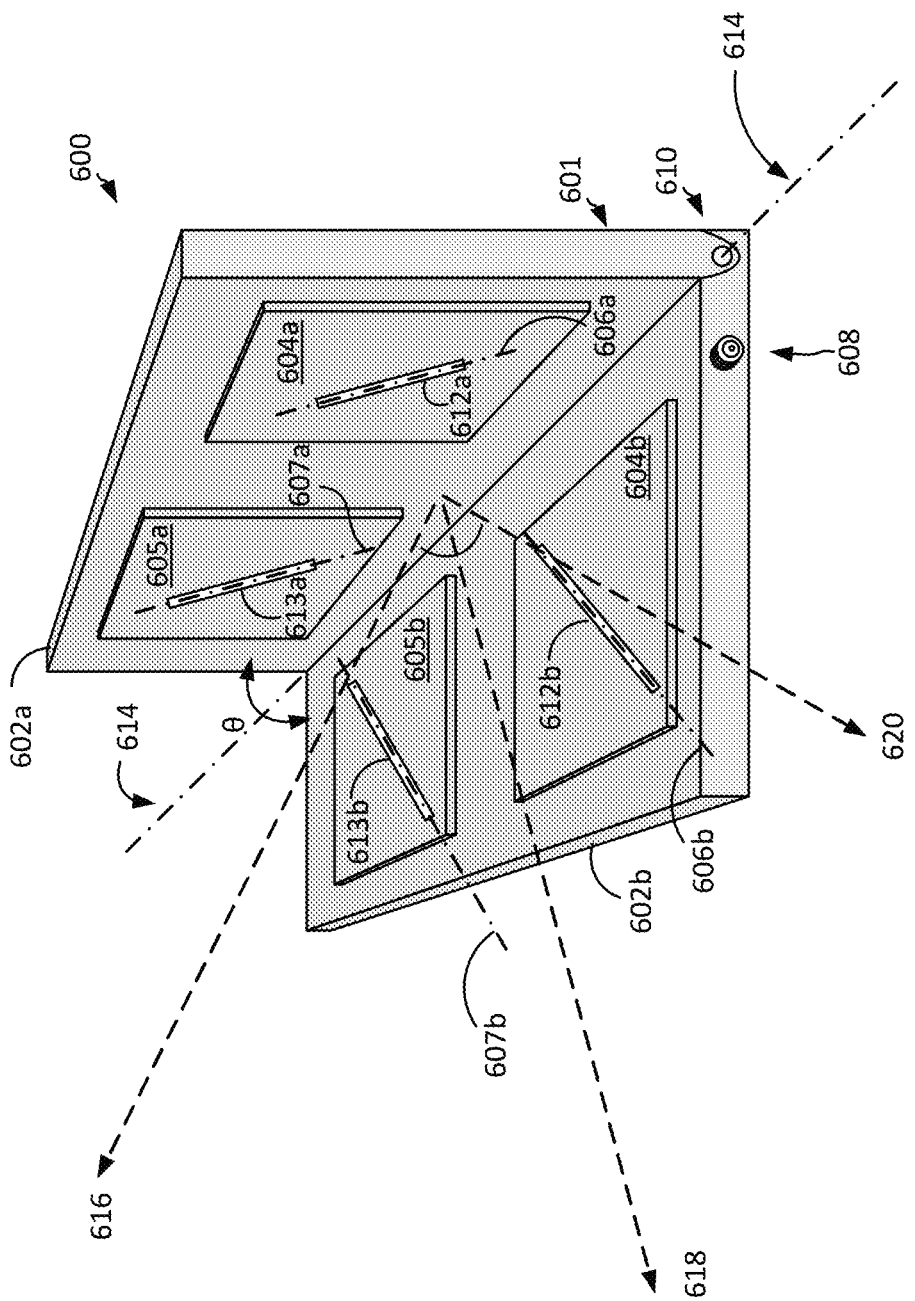
FIG. 6 is a perspective view of a three-polarization antenna system according to a second embodiment, which is useful for understanding the invention.

The arrangement shown in FIG. 6 is similar in some respects to the arrangement described in FIGS. 1-4. The RFID antenna system 600 includes an antenna fixture 601 having a first portion 602a and a second portion 602b joined along an alignment axis 614. A first planar antenna element 612a having a first polarization direction 606a is aligned with a first plane which can be defined by a first planar substrate 604a. The first planar substrate 604a is formed of a suitable dielectric material layer, a metal foil layer which forms a ground plane, or a combination of these two layers. The first planar antenna element can be any of various well known types of planar antenna elements such as a dipole or a patch antenna. The first planar substrate 604a, including the first planar antenna element, is secured to the first portion 602a of the antenna fixture as shown.

A second planar antenna element 612b is disposed on a second planar substrate 604b. The second planar substrate is similar to the first planar substrate 604a. The second planar antenna element has a second polarization direction 606b that is aligned with a second plane. For example, the second plane can be defined by the second planar substrate 604b. The second planar substrate 604b, including the second planar antenna element 612b, is secured to the second portion 602b of the antenna fixture. The second plane defined by planar substrate 604b is transverse to the first plane defined by planar substrate 604a such that the first and second planes intersect along the alignment axis 614 or a line which is parallel to the alignment axis.

A third planar antenna element 613a having a third polarization direction 607a is disposed on a third planar substrate 605a, aligned with the first plane as defined by the first planar substrate 604a. The third polarization direction can be parallel to the first polarization direction. The third planar substrate 604a can be formed of a suitable dielectric material layer, a metal foil layer which forms a ground plane, or a combination of these two layers. The third planar antenna element 613a can be any of various well known types of planar antenna elements such as a dipole or a patch antenna. A slot antenna may also be used for this purpose. The third planar substrate 605a, including the third planar antenna element, is secured to the first portion 602a of the antenna fixture as shown.

A fourth planar antenna element 613b can be disposed on a fourth planar substrate 605b. The fourth planar substrate is similar to the first, second and third planar substrates. The fourth planar antenna element 613b has a fourth polarization direction 607b that is aligned with the second plane (e.g. the plane defined by the second planar substrate 604b). Notably, the fourth polarization direction can be parallel to the second polarization direction. The fourth planar substrate 605b, including the fourth planar antenna element 613b, is secured to the second portion 602b of the antenna fixture. Although the first and third planar substrates are shown as separate from each other in FIG. 6, these two substrates can instead be a single planar substrate with antenna elements 612a, 613a disposed thereon. Similarly, although third and fourth planar substrates 604b, 605b are shown as two separate elements, these can be instead a single planar substrate with antenna elements 612b, 613b disposed thereon.

As may be observed in FIG. 6, the third and fourth polarization direction as defined by the third and fourth planar antenna elements 613a, 613b is each arranged so that it is oblique with respect to the alignment axis 614. With the arrangement as described herein, the third and fourth planar antenna elements will in combination always produce three-polarization RF electromagnetic radiation as described above.

In the antenna system 600, the antenna fixture 601 is essentially a supporting element and the planar antenna elements 612a, 612b, 613a, 613b are generally exposed. However, the invention is not limited in this regard and the antenna fixture 601 can optionally comprise a housing which fully or partially encloses the first, second, third and fourth planar antenna elements. The fixture can be formed of metal or plastic. However, if the fixture comprises a housing which encloses the antenna elements, the material which covers the antenna elements should be chosen so as not to interfere with the antenna pattern. Accordingly, a suitable dielectric material can be preferred for the housing in such scenarios.

Figure 7A:
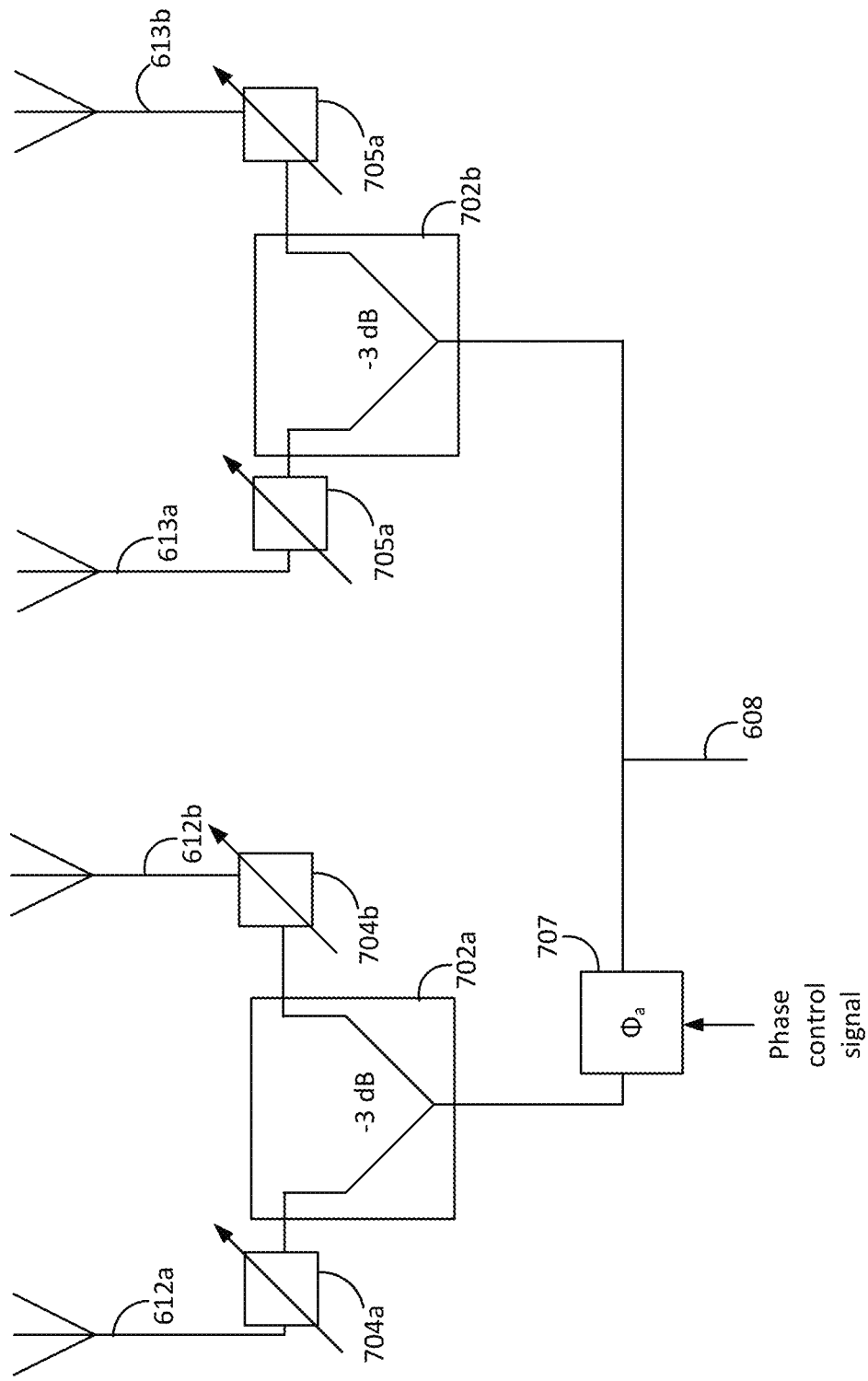
FIG. 7A is a schematic diagram that is useful for understanding a first exemplary feed circuit which can be used in the three-polarization antenna system shown in FIG. 6.

The antenna system 600 will advantageously have a single excitation point in the form of an antenna feed port 608 which is preferably provided directly on the antenna fixture or housing. The antenna feed port 608 is electrically coupled to at least one of the first and second planar antenna elements 612a, 612b. Similarly, the antenna feed port 608 is electrically coupled to at least one of the third and fourth planar antenna elements 613a, 613b. Two feeding methodologies can be considered for such an antenna system. In a direct feed arrangement as shown in FIG. 7A, the feed port 608 is connected to RF power-divider circuits 702a, 702b and signals applied to the feed port 608 will be divided between the first, second, third and fourth planar antenna elements 612a, 612b, 613a, 613b. Signals received by the antenna elements 612a, 612b, 613a, 613b will be summed at the antenna port 608 and communicated by means of suitable RF cabling to an RFID reader (e.g. RFID reader 110).

Figure 7B:
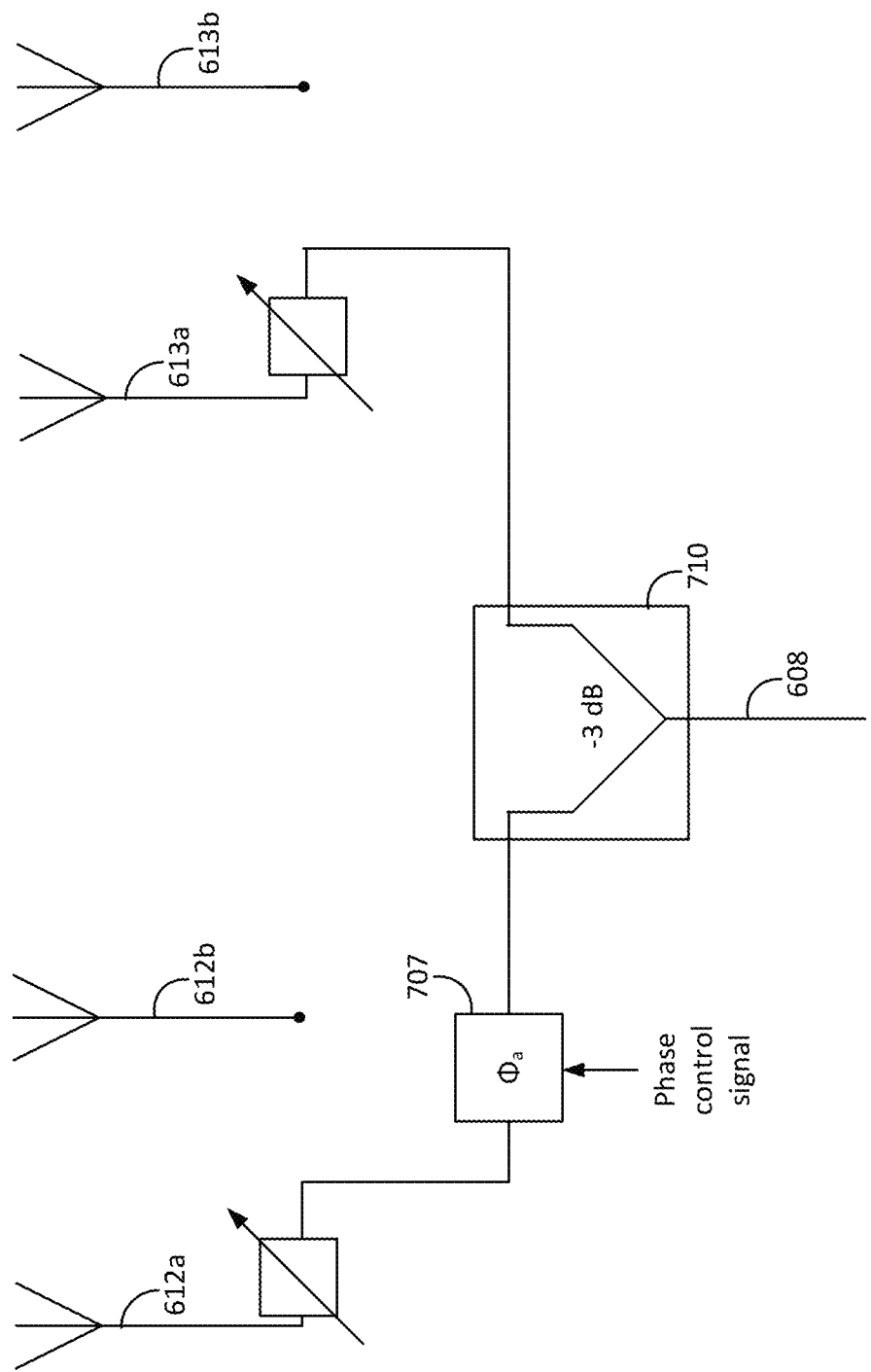
FIG. 7B is a schematic diagram that is useful for understanding a second exemplary feed circuit which can be used in the three-polarization antenna system shown in FIG. 6.

Alternatively, in an indirect feeding method shown in FIG. 7B, only antenna elements 612a, 613a will be excited directly from the feed port as shown. For example a power divider 710 can be used to route power from feed port 608 to each of antennas 612a, 613a. However, since these two antenna elements are in close proximity respectively to planar antenna elements 612b, 613b (e.g., less than 1 wavelength) each each will necessarily reside in the near-field of the other antenna and will thus be tightly coupled. In other words, planar antenna element 612a will be tightly coupled to 612b, and planar antenna element 613a will be tightly coupled to 613b. Accordingly, an antenna element 612b will also be excited by antenna element 612a, even though not directly connected by cabling or other components to the feed port 608. Similarly, an antenna element 613b will also be excited by antenna element 613a, even though not directly connected by cabling or other components to the feed port 608. The various antenna elements will similarly interact when signals are received at the antenna system from an RFID tag.

The two planar antenna elements 612a, 612b will interact with each other in their near-field/active zone. Similarly, the two planar antenna elements 613a, 613b will interact with each other in their near-field zone. In each case, if the two planar antenna elements were arbitrarily fed with RF energy and positioned close to one another by a field installer so as to permit such near-field interaction, the resulting RF field pattern would contain nulls and other field distortions which would result in sub-optimal RFID system performance. However, because the form factor of the antenna system 600 is established in advance by the fixture 601, the interaction of the antenna elements 612a, 612b and the feed network for the antenna can be analyzed and tuned at design time. Similarly, the interaction of the antenna elements 613a, 613b and the associated feed network for these elements can be analyzed and tuned at design time. By using suitable commercially available antenna analysis software and applying known antenna design principles, three-polarization RF radiation can be achieved from the antenna system 600 with a desired antenna pattern. The design of the antenna will naturally involve consideration of the position and orientation of the antenna elements 612a, 612b, 613a, 613b as defined by the fixture 601 which will affect interaction of the antenna elements with each other in the near field.

Using the design methods described herein, three-polarization radiation with an optimized antenna radiation pattern can be achieved when the four antenna elements are maintained in their fixed transverse orientation, in which the first plane and second plane may be orthogonal with respect to one another (or form a different angle). The resulting antenna system 600 will include at least one tuned element 704a, 704b for antenna elements 612a, 612b, and at least one tuned element 705a, 705b for antenna elements 613a, 613b. These elements are shown in FIGS. 7A and 7B. In each case, the at least one tuned element will be designed and implemented to mitigate near-field interference as between an adjacent antenna element when the first and second planar antenna elements are mounted in the antenna fixture. The tuned element 704a, 704b, 705a, 705b can be selected and/or optimized using commercially available electromagnetic modeling and simulation software.

According to one aspect, the tuned element 704a, 704b, 705a, 705b can be a reactive component or a network of reactive components. In such a scenario, the reactive component or network can be provided in one or both of the feed paths for planar antenna elements 612a, 612b and planar antenna elements 613a, 613b. Alternatively, the reactive component or network can be electrically connected to a portion of one or the planar antenna elements. According to another aspect, the tuned element may be integral to the first, second, third and/or fourth planar antenna elements. For example, the tuned element may involve certain modifications to the dimensions, geometry and/or feed point of a planar antenna element 612a, 612b, 613a, 613b. In a manner similar to that described above with respect to antenna system 200, one or more of the tuned elements 704a, 704b, 705a, 705b may have field selectable or adjustable settings that facilitate variations in the angle between first plane and second plane.

With an RFID antenna system 600 having the arrangement described herein, the first and second polarization directions 606a, 606b are each transverse to the alignment axis 614 and in different planes (first and second planes defined by first and second planar substrates 604a, 604b). Similarly, the third and fourth polarization directions 607a, 607b are each transverse to the alignment axis 614 and in different planes. In a preferred embodiment, the first, second, third and fourth polarization directions are each arranged at an oblique angle with respect to the alignment axis. Accordingly, signals applied to the antenna feed port 608 will result in three-polarization radiation. Likewise, received signals having a polarization direction defined by vectors in any of three orthogonal axes can be efficiently processed by the antenna system 600.

It will be appreciated that antenna system 600 is similar to antenna system 200, except that in this embodiment two or more planar antenna elements 612a, 613a are disposed on a first portion of an antenna fixture 601. Similarly, two or more planar antenna elements 612b, 613b are disposed on a second portion of an antenna fixture 601.

In some scenarios, the first and second planes of antenna system 600 are orthogonal, but the invention is not limited in this regard and the fixture 601 can be designed to pivot or rotate about the alignment axis (or a line parallel to the alignment axis) so that the angle between the plane of antenna elements 612a, 613a can be varied with respect to the plane of antenna elements 612b, 613b. For example a hinge 610 or other type of pivoting element can be provided to facilitate such movement. Such an arrangement can facilitate a variety of different installation scenarios. Moreover, the field adjustable tuning elements 704a, 704b, 705a, 705b with field adjustable tuning controls can allow a field technician to predictably assure an RFID installation with an optimized three-polarization antenna pattern, without the need for complex computer modeling and analysis. In such a scenario, a plurality of defined antenna tune settings for the adjustable tuning elements are predetermined using computer modeling for each of a plurality of different angular positions defined by the angle between the first and second plane. The field technician needs only then to determine the angle between the two planes, and then set or adjust the tune settings in accordance with predetermined values specified by the computer modeling to achieve optimal three-polarization field patterns.

The field installation optimized RFID antenna system 600 further includes at least one dynamic phase control element 707 as shown in FIGS. 7A and 7B. The phase control element is responsive to a phase control signal to dynamically shift a phase of a signal applied to the first and second planar antenna element relative to the phase of signals applied to the third and fourth planar antenna elements. Such an arrangement facilitates steering a direction of an antenna pattern while also providing three-polarization radiation capability as described above. For example, the antenna pattern can be steered in a direction indicated by arrows 616, 618 and 620 as shown in FIG. 6. Accordingly, a phased array antenna system with three-polarization capability and predictable antenna pattern can be quickly and efficiently set-up in the field by a relatively unskilled technician.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A field installation optimized radio frequency identification (RFID) antenna system, comprising:
    an antenna fixture having a first portion and a second portion joined along an alignment axis;
    a first planar antenna element having a first polarization direction aligned with a first plane, and secured to the first portion of the antenna fixture;
    a second planar antenna element having a second polarization direction aligned with a second plane, the second planar antenna element secured to the second portion of the antenna fixture so that the second plane is transverse to the first plane and the first and second planes intersect along a line parallel to the alignment axis;
    an antenna feed port secured to the fixture directly coupled to at least one of the first and second planar antenna elements;
    a passive element comprising at least one of a capacitor, an inductor and a resistor, and having a plurality of manually variable settings that are selectable by an installation technician in a field setting to predictably conform the RFID antenna system to an angle determined by the first and second planes; and at least one tuned element which mitigates near-field interference between the first planar antenna element and the second planar antenna element when the first and second planar antenna elements are mounted in the antenna fixture;

wherein a plurality of optimal settings for the at least one tuned element is predetermined at a design time to correspond to a plurality of angular positions defining the angle; and wherein the first polarization direction is transverse to the second polarization direction whereby signals applied to the antenna feed port will result in three-polarization radiation.

2. The field-installation optimized RFID antenna system according to claim 1, wherein the first and second polarization directions each form an oblique angle with respect to the alignment axis.

3. The field installation optimized RFID antenna system according to claim 1, wherein the first and second planes are orthogonal.

4. The field installation optimized RFID antenna system according to 1, wherein the at least one tuned element is integrated into at least one of the first and second planar antenna elements.

5. The field installation optimized RFID antenna system according to 1, wherein the antenna fixture is rotatably adjustable along the alignment axis to selectively vary an angle between the first and second plane in accordance with an installation requirement.

6. The field installation optimized RFID antenna system according to claim 1, further comprising a third planar antenna element disposed in alignment with the first plane and having a third polarization direction parallel to the first polarization direction, the third planar antenna element secured to the first portion of the antenna fixture; and a fourth planar antenna element disposed in alignment with the second plane and having a fourth polarization direction parallel to the second polarization direction, the fourth planar antenna element secured to the second portion of the antenna fixture; and wherein the antenna feed port is directly coupled to at least one of the third and fourth planar antenna elements.

7. The field installation optimized RFID antenna system according to claim 6, wherein the first and second planes are orthogonal.

8. The field installation optimized RFID antenna system according to 6, wherein the at least one tuned element is integrated into at least one of the first, second, third and fourth planar antenna elements.

9. The field installation optimized RFID antenna system according to claim 6, further comprising at least one dynamic phase control element which is responsive to a control signal to dynamically shift a phase of a signal applied to the first and second planar antenna element relative to the phase of signals applied to the third and fourth planar antenna elements for steering a direction of an antenna pattern having three-polarization radiation.

10. The field installation optimized RFID antenna system according to 9, wherein the antenna fixture is rotatably adjustable along the alignment axis to selectively vary an angle between the first and second plane in accordance with an installation requirement.

11. A field installation optimized radio frequency identification (RFID) antenna system, comprising:

an antenna fixture having a first portion and a second portion joined along an alignment axis;

a first planar antenna element having a first polarization direction aligned with a first plane and oblique to the alignment axis, the first planar antenna element secured to the first portion of the antenna fixture;

a second planar antenna element having a second polarization direction aligned with a second plane and oblique to the alignment axis, the second planar antenna element secured to the second portion of the antenna fixture so that the second plane is transverse to the first plane and the first and second planes intersect along a line parallel to the alignment axis;

an antenna feed port secured to the fixture directly coupled to at least one of the first and second planar antenna elements;

a passive element comprising at least one of a capacitor, an inductor and a resistor, and having a plurality of manually variable settings that are selectable by an installation technician in a field setting to predictably conform the RFID antenna system to an angle determined by the first and second planes; and at least one tuned element which mitigates near-field interference between the first planar antenna element and the second planar antenna element when the first and second planar antenna elements are mounted in the antenna fixture;

wherein a plurality of optimal settings for the at least one tuned element is predetermined at a design time to correspond to a plurality of angular positions defining the angle; and wherein the first polarization direction is transverse to second polarization direction whereby signals applied to the antenna feed port will result in three-polarization radiation.

12. The field installation optimized RFID antenna system according to claim 11, wherein the first and second planes are orthogonal.

13. The field installation optimized RFID antenna system according to 11, wherein the at least one tuned element is integrated into at least one of the first and second planar antenna elements.

14. The field installation optimized RFID antenna system according to 11, wherein the antenna fixture is rotatably adjustable along the alignment axis to selectively vary an angle between the first and second plane in accordance with an installation requirement.

15. The field installation optimized RFID antenna system according to claim 11, further comprising a third planar antenna element disposed in alignment with the first plane and having a third polarization direction parallel to the first polarization direction, the third planar antenna element secured to the first portion of the antenna fixture; and a fourth planar antenna element disposed in alignment with the second plane and having a fourth polarization direction parallel to the second polarization direction, the fourth planar antenna element secured to the second portion of the antenna fixture; and wherein the antenna feed port is directly coupled to at least one of the third and fourth planar antenna elements.

16. The field installation optimized RFID antenna system according to claim 15, further comprising at least one dynamic phase control element which is responsive to a control signal to dynamically shift a phase of a signal applied to the first and second planar antenna element relative to the phase of signals applied to the third and fourth planar antenna elements for steering a direction of an antenna pattern having three-polarization radiation.

* * * * *